United States Patent
Rabenhorst et al.

[15] 3,671,965
[45] June 20, 1972

[54] RAPID DEPLOYMENT CORNER REFLECTOR

[72] Inventors: David W. Rabenhorst, Silver Spring; Kenneth E. Darnell, Laurel, both of Md.

[73] Assignee: The United States of America as represented by the Secretary of the Navy

[22] Filed: April 3, 1970

[21] Appl. No.: 25,483

[52] U.S. Cl. ............................343/18 C, 343/705, 343/915
[51] Int. Cl. ....................................H01q 1/28, H01q 15/20
[58] Field of Search ...................343/18, 705, 708, 915, 18 C

[56] References Cited

UNITED STATES PATENTS

| | | | |
|---|---|---|---|
| 2,463,517 | 3/1949 | Chromak | 343/915 |
| 3,391,882 | 7/1968 | Johnson et al. | 343/705 |
| 3,568,191 | 3/1971 | Hiester | 343/18 B |
| 3,126,544 | 3/1964 | Greatbatch | 343/18 E |
| 3,217,325 | 11/1965 | Mullin | 343/18 C |
| 3,530,469 | 9/1970 | Dailey et al. | 343/915 |

FOREIGN PATENTS OR APPLICATIONS

| | | | |
|---|---|---|---|
| 812,376 | 2/1971 | Great Britain | 343/18 |

*Primary Examiner*—Eli Lieberman
*Attorney*—Richard S. Sciascia, J. A. Cooke and R. J. Erickson

[57] ABSTRACT

A readily deployable, lightweight radar reflector having a large radar signature, the invention is compactly stowable aboard a carrier vehicle, immediately assuming an erect configuration on ejection from an airborne or surface vehicle. The present reflector is particularly intended to be ejected from aircraft traveling at high speeds, the erection of the reflecting surface being provided by the internal bias of pre-stressed hoops surrounding and supporting the reflecting surface.

1 Claim, 4 Drawing Figures

PATENTED JUN 20 1972

INVENTORS
DAVID W. RABENHORST
KENNETH E. DARNELL
BY
J. O. Tresansky
ATTORNEY

INVENTORS
DAVID W. RABENHORST
KENNETH E. DARNELL

INVENTORS
DAVID W. RABENHORST
KENNTH E. DARNELL

RAPID DEPLOYMENT CORNER REFLECTOR

BACKGROUND AND SUMMARY OF THE INVENTION

Radar reflecting devices have long been known in the art. Often, these devices have utilized some form of "corner reflector" comprising three planar reflective surfaces set mutually perpendicular so as to define the internal corner angle of a cube. Such a combination of surfaces has the property of reflecting along a path parallel to their incident path, those waves striking any of its surfaces from any direction within the solid angle defined by the surfaces. Thus, if a total of eight of these corner reflectors have their apices situated at one common point, then an identical radar reflection would result regardless of the direction from which the radar wave originated.

A suitable choice of reflective material enables the reflector described to produce a radar return usually greater than that produced by an aircraft or by a cross-section of a ship. For this reason, prior radar reflecting devices have generally been used as radar decoys, although a number of other uses exist. However, these prior devices generally are not compactly stowable nor are they rapidly deployable.

Prior reflectors are conveniently catagorized as having rigid supporting members or as having inflatable erection mechanisms. Wood, in U. S. Pat. No. 3,283,328, exemplifies those radar reflectors which utilize rigid members for support and, in the case of the spring-loaded extender struts disclosed therein, for erection of the reflecting surfaces. The Wood reflector cannot be conveniently stored due to the presence of the rigid extender struts, and, since the struts are collapsible, the reflector is not rapidly deployable.

Chromak, in U. S. Pat. No. 2,463,517, proposes to mount an octahedral corner reflector inside an inflatable spherical balloon composed of wave-permeable material by joining the ends of the lines of intersection of the surfaces, that is, the apices, to the internal surface of the balloon. Although such a structure is compactly disposable in a reduced volume, the balloon is not rapidly inflatable. Uneven expansion of the balloon due to faults in the balloon material or to over or under inflation of the balloon causes puckering of the reflector surfaces and thus an uneven radar return.

The radar reflectors described do not provide in a single structure the capabilities of being stored in a reduced volume and being almost instantaneously erectable from the stowed configuration. The present invention provides a radar reflector having these capabilities and which further exhibits the capability of being ejectable from a high-speed aircraft without incurring damage to the reflector.

The present reflector thereby finds particular use as a means for neutralizing radar-homing missiles and other radar-dependent anti-aircraft weapons. The reflector, being lightweight and compactly stowable aboard an aircraft, is conveniently deployed by the pilot when an incoming missile is detected. A charge of compressed air is sufficient to eject the reflector from the aircraft, whereupon the reflector immediately assumes a functional erected configuration.

Erection of the reflector is accomplished by hoops stowable in a minimum volume and composed of a material having an internal stress, or elasticity, which causes them to assume a circular or elliptical configuration on release from storage constraint. The hoops support a radar reflecting unit, preferably comprising the octahedral corner reflector described above, the hoops erecting the reflecting surfaces of the unit coincident to assuming their pre-stressed circular configuration.

Accordingly, it is an object of the invention to provide a radar reflective device which is lightweight and compactly stowable in a minimum volume.

It is another object of the invention to provide a rapidly deployable radar reflector which is virtually instantaneously erectable upon release from storage constraint.

A further object of the invention is to provide a radar reflector having a large radar signature and which is ejectable to functional configuration from a high speed aircraft.

Further objects and advantages will become more readily apparent in light of the following detailed description of the preferred embodiments of the invention.

DESCRIPTION OF THE PREFERRED EMBODIMENTS

Figure 1:
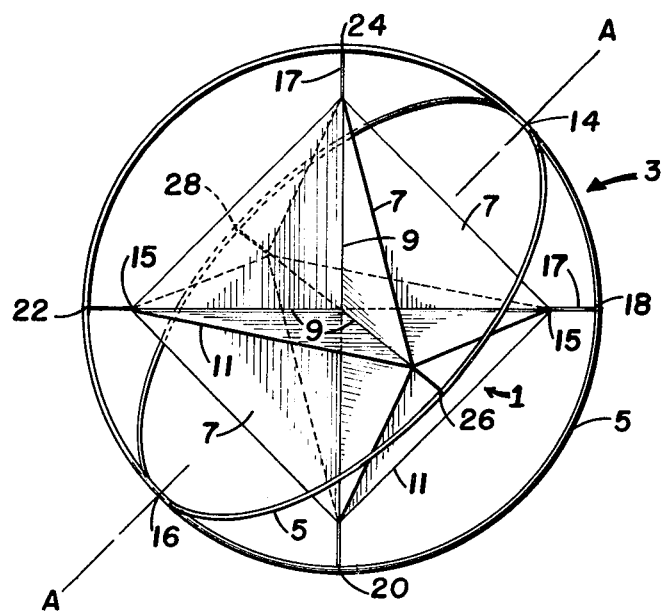
FIG. 1 is a perspective of a first embodiment of the invention depicting on octahedral reflector and supporting framework in operative position.

A first embodiment of the invention shown in FIG. 1 comprises an octahedral reflector 1 supported within a framework 3 which consists primarily of two circular hoops 5. The reflector 1 may be assembled from 12 identical sheets 7 of flexible radar wave-reflective material of right-angled isosceles triangular shape, the sheets 7 being secured together along side edges 9 with their right-angled apices coinciding so that the base edges 11 of the sheets 7, when said sheets are held taut and flat, define the edges of a regular octahedron.

The sheets 7 may be constructed from metallized textile fabric, from metal foil, from metallized Mylar plastic, or from other suitable radar wave-reflective material. The sheets 7 are secured along the edges 9 by stitching, by adhesive, or, in the case of plastic, by heat sealing.

The reflector 1 is supported in its erect configuration by means of the framework 3. The hoops 5 provide primary support for the reflector 1, the hoops 5 being securely attached at right angles at joints 14 and 16. The major axis, A—A, of the framework 3 is along the line between the joints 14 and 16. The assembled hoops 5, being circular, define a sphere, each lune section between successive semi-circular portions of the hoops being one-quarter of the sphere. Each corner 15 of the reflector 1 is attached to one of the hoops 5 at points 18, 20, 22, 24, 26, and 28, the points 18 through 24 being located on one of the loops 5 with the second hoop 5 having two points, 26 and 28, of attachment to the reflector 1. Support wires 17 provide attachment of the corners 15 to the respective points 18 through 28.

The loci of the points 18 through 24 on the first hoop 5 are regularly disposed on said hoop, being equally spaced along the hoop at intervals equal to one-quarter of the circumference of said hoop. Since non-elastic support wires 17 are used in this embodiment of the invention, the loci of the points 18 through 24 must be offset from the joints 14 and 16 by one-eighth of the circumference of the hoop 5. Attachment of any of the corners 15 to the joints 14 or 16 would prevent deformation of the reflector and framework assembly to the storage configuration, as will be described hereinafter. Attachment of four of the corners 15 to one of the hoops 5 automatically determines the location of the attachment points 26 and 28 on the second hoop 5.

Figure 3:
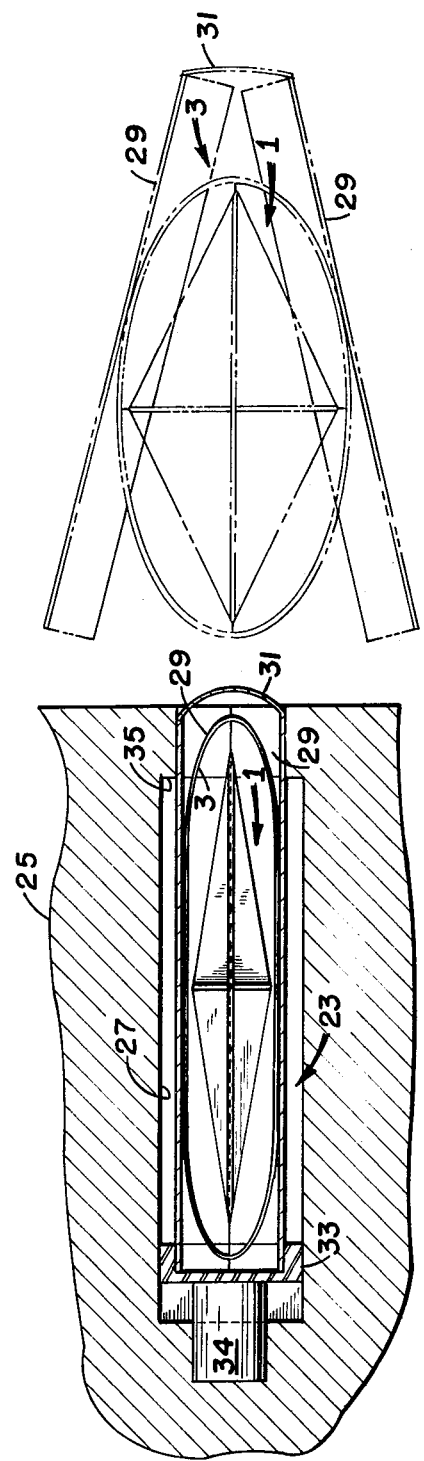
FIG. 3 is a section of a possible apparatus for ejecting the reflective device from an aircraft, a partially deployed reflective device being shown in phantom immediately after ejection thereof; and, FIG. 4 is a perspective of a tactical situation in which the invention finds utility.

As illustrated clearly in FIG. 1, the reflector 1 is held in a fully erect configuration by the framework 3. Since the hoops are fabricated from a resilient material having internal elastic stress, the framework 3 may be reversibly deformed about the axis A—A to a diameter less than one-tenth of its original diameter. Deformation of the framework 3 allows low volume storage of the present device by constraining said framework 3 along the axis A—A, such as within a cylindrical tube, as shown in FIG. 3. Constraint of the framework 3 also allows the reflector 1 to be folded into a collapsed position within said framework. Release of the constraint imposed on the framework enables the hoops 5 to rapidly resume their pre-stressed circular configuration, thus erecting the reflector 1 to its operative octahedral shape. A suitable choice of material for the hoops 5, such as one-eighth inch diameter piano wire, spring steel, fiberglas fibers in a rubber matrix, or resilient plastic materials, enables the construction of a lightweight framework capable of erecting and supporting the reflector 1.

Figure 2:
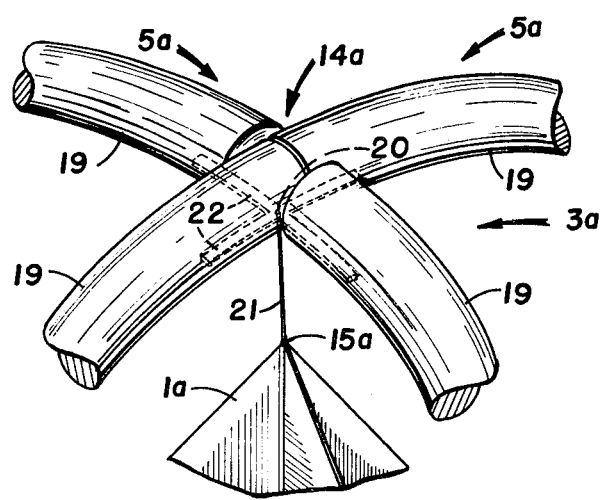
FIG. 2 is an enlarged detail perspective of the juncture of the hoops comprising the supporting framework of a second embodiment of the invention.

In FIG. 2, a second embodiment of the invention is shown in an enlarged detail view of the juncture of two hoops 5a. The hoops 5a consist of semi-circular pieces 19 which are hinged to maintain the circular integrity of the hoops 5 and form a part of a framework 3a. The semi-circular pieces 19 intersect at joint 14a and are hingably mounted in abutting relation by a flat, cruciform elastic hinge 20 comprising four leaves 22. Each leaf 22 is fixedly attached to one of the pieces 19 to maintain said pieces 19 in the desired cooperative relation. One of the hoops 5a comprises two contiguous pieces 19, the second hoop 5a being formed from pieces 19 which are not contiguous to each other but abut the first hoop 5a on opposite sides thereof. A second hinge (not shown) identical to hinge 20 may be disposed on the diametrically opposite side of the joint 14a to lend additional stability. Use of the hinge 20 is only an example of one suitable approach to hingably joining the hoops 5a. Since the hoops 5a are hinged, and thus are more readily bendable, at the joint 14a (and at the diametrically opposite joint which is not shown), the framework 3a may be deformed into a volume approaching the reduced solid cross-sectional diameter of the material in the reflector framework assembly. A reflector 1a may be attached to the framework 3a in the manner described for the embodiment of FIG. 1 or elastic supporting lines 21 may join diametrically opposite corners 15a of the reflector 1a to the joint 14a and to the diametrically opposite joint (not shown). Thus, when the framework 3a is deformed for storage purposes, the elastic lines 21 extend to prevent destruction of the reflector 1a. The remaining corners 15a of the reflector do not require elastic connection to the framework 3a and may simply be attached to said framework with non-elastic support wire.

The present invention is particularly useful in an application requiring extremely rapid deployment and where advantage is found in minimum weight and storage volume. The reflector structure of the present invention is particularly designed for ejection from a high-speed aircraft or spacecraft. In an aircraft the present invention may be conveniently stored in a hollow cylindrical tube, the axis of the framework 3 or 3a of the invention being coincident with the axis of the tube. The framework 3 may be deformed to a diameter less than one-tenth of the free diameter of one of the hoops 5 without inducing a permanent set in either of the hoops. The framework 3a may be deformed into an even smaller volume.

To eject the reflective device from an aircraft, the entire tube containing said device may be ejected and slowed with a parachute, the reflective device being subsequently discharged from the tube by an explosive charge. Alternatively, the reflective device of the present invention may be ejected directly from the aircraft by a compressed air charge or other appropriate means. The device must be ejected rearwardly of the craft at a velocity nearly equal to the forward velocity of the aircraft so that the relative air speed of the ejected reflective device approaches zero. In this situation, the reflective device immediately assumes an operative configuration for decoying the scanning radar of an approaching missile or other hostile body. Since the reflective device is lightweight and experiences a high drag effect, the device descends slowly, providing a radar signature sufficiently large to prevent the ejecting aircraft from being the primary radar return received.

The present device may be ejected from an aircraft by the apparatus shown in FIG. 3. The radar reflector of the invention shown in FIG. 1 is disposed in a tube 23 which is located in the rear of the fuselage of an aircraft, a portion of which is shown at 25. The tube 23 is disposed within a cylindrical recess 27 in the fuselage, which recess has a larger diameter than does the tube 23. The tube 23 is seen to comprise two semi-cylinder portions 29 which are held together at the aft ends thereof by a band spring 31 and at their forward ends by a sleeve-like cap 33 having a diameter greater than that of the tube 23 but less than that of the recess 27. When an incoming radar-homing missile or other radar is detected, the tube 23 is ejected from the recess 27 by an explosive charge 34 directed against the cap 33. In order to simplify the drawing, the means employed to actuate the charge 34 is not shown. As the tube 23 exits the recess 27, a cylindrical shoulder extension 35, having a diameter sufficiently large to allow passage of the tube 23 therethrough, strips the cap 33 from the tube 23, allowing the band spring 31 to separate the semi-cylinder portions 29 and thereby free the radar reflector from the restraining influence of said tube. The framework 3 of the radar reflector immediately assumes its pre-stressed configuration, thereby erecting the reflector 1 to its operative position. As previously noted, the tube 23 is ejected rearwardly from the aircraft at a velocity nearly equal to the forward velocity of the aircraft in order to allow erection of the reflector 1 at a relative air speed approaching zero.

Figure 4:
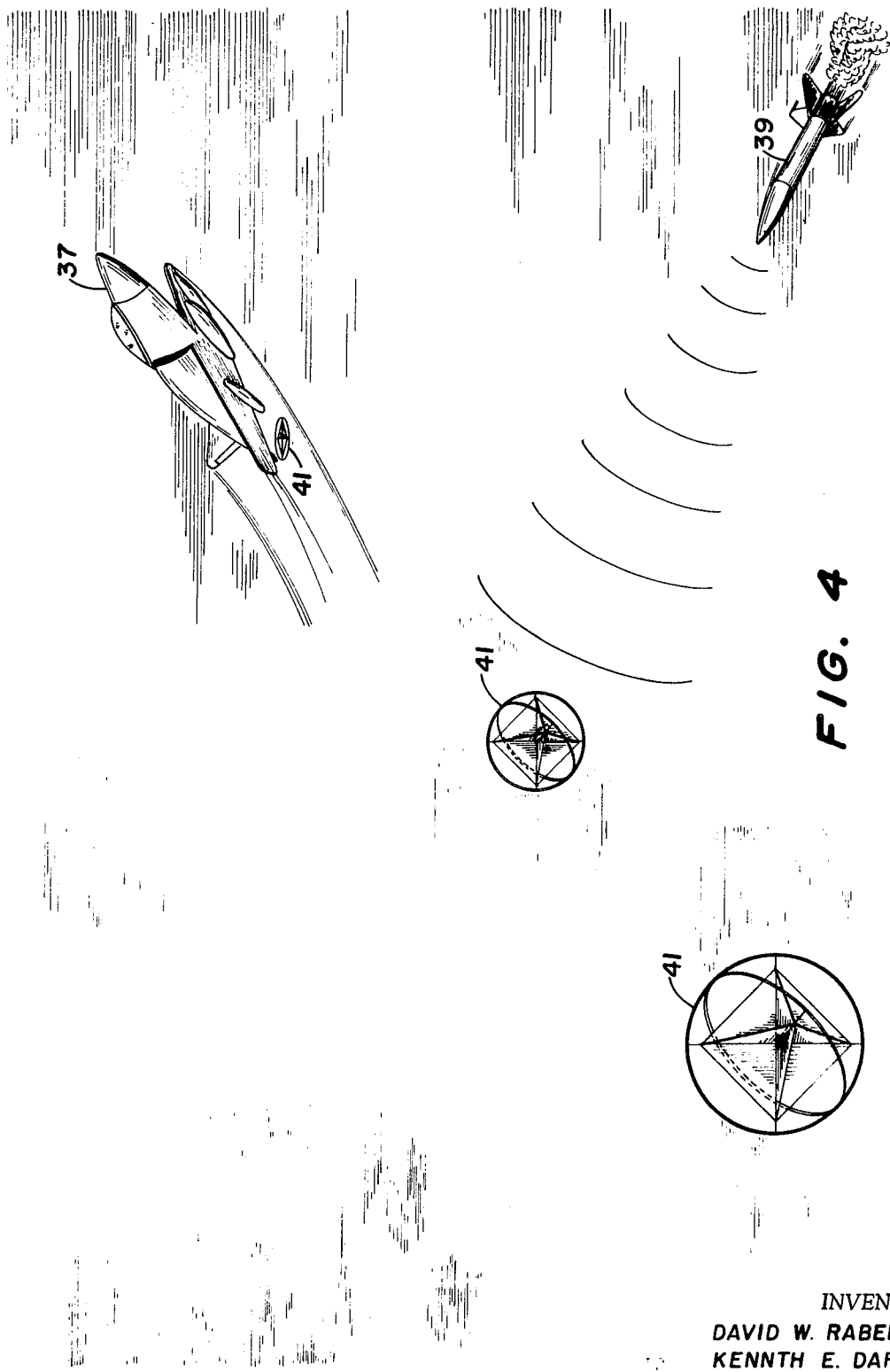

FIG. 4 is a perspective showing an intended use of the invention. An aircraft 37, on detecting the presence of an incoming radar-homing missile 39, ejects one or more radar reflective devices 41 according to one of the various ejection methods described hereinabove. In the drawing, one of the devices 41 is seen immediately after ejection while assuming the operative configuration. The second reflective device 41 is shown fully deployed almost instantaneously after ejection from the aircraft 37. Since, the missile 39 receives a radar signature from the reflective device 41 prior to the attainment of any significant distance between the device 41 and the aircraft 37, a scanning radar, even though initially "locked on" the aircraft, is decoyed by the larger return of the reflective device 41.

It is to be understood that the invention may be practiced in ways other than those specifically delineated hereinabove without departing from the scope of the invention as defined in the appended claims. For example, the hoops 5 of the present reflective device may be formed in their circular configuration from the nickel-titanium alloy Nitinol heat treated, and subsequently packed within a metallic ejection tube. Sufficient heating of the tube containing the Nitinol hoops prior to ejection of the reflective device from the tube 23 results in the hoops resuming their pre-stressed configuration upon ejection, thereby erecting the reflector 1 and operatively supporting said reflector. Use of radar reflecting surfaces other than the "corner reflector" described herein is also within the scope of the invention. Similarly, more than two hoops 5 could be used in the framework 3, depending on structural requirements for a particular reflective structure or mission.

We claim:

1. In a system for ejecting a rapidly deployable, self-erecting reflective device from an aircraft,
    a supporting framework of solid, resilient hoops intersecting at right angles at each of two locations on the hoops to form joints, the hoops being pre-stressed to resist deformation thereof;
    wave reflective means mounted within the spatial boundaries defined by the framework, said means comprising a regular octahedral corner reflector having six corners, four of said corners being attached to the framework at points on one of said hoops, which points are removed from the joints by one-eighth of a circumference of the hoops, the remaining two corners being attached to the framework at points on the second hoops;
    connecting means joining the corners of the wave reflective means to the points on the supporting framework;
    restraining means formed in the aircraft for retaining the framework and attached wave reflective means in a reduced volume and under stress, the framework being deformed along an axis through the joints and the reflective means being collapsed under the influence of said restraining means, the restraining means comprising a cylindrical tube composed of two semi-cylindrical portions, a resilient band connecting corresponding aft ends of said portions and urging said portions apart, and a sleeve-like cap connecting corresponding forward ends of said portions; and means for ejecting the framework and attached wave reflective means from the vehicle, whereby said framework and attached wave reflective means will be released from the restraining means, the framework instantaneously reassuming its original configuration, thereby erecting said wave reflective means to an operative configuration, the ejection means comprising a cylindrical recess in the aircraft for receiving the cylindrical tube, which recess has a shoulder near its aft end, and pressure-producing means in the forward end of said recess for ejecting the tube from the recess, the shoulder displacing the cap from the tube as said tube moves from the recess to allow the tube portions to be biased apart by said resilient band, thereby releasing the framework and attached wave reflective means.

* * * * *